US012621385B1

(12) United States Patent
Dziuk et al.

(10) Patent No.: US 12,621,385 B1
(45) Date of Patent: May 5, 2026

(54) CALL SOURCE VERIFICATION

(71) Applicant: UIPCO, LLC, San Antonio, TX (US)

(72) Inventors: Janelle Denice Dziuk, Falls City, TX (US); Jon D. Mceachron, Boerne, TX (US); Steven Michael Bernstein, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 658 days.

(21) Appl. No.: 18/145,530

(22) Filed: Dec. 22, 2022

(51) Int. Cl.
  *G10L 25/03* (2013.01)
  *H04M 3/42* (2006.01)

(52) U.S. Cl.
  CPC ......... *H04M 3/42042* (2013.01); *G10L 25/03* (2013.01)

(58) Field of Classification Search
  CPC ....................................................... G10L 25/00
  USPC .......................................................... 455/415
  See application file for complete search history.

(56) References Cited

U.S. PATENT DOCUMENTS

| | | | |
|---|---|---|---|
| 6,711,400 B1 | 3/2004 | Aura | |
| 8,554,674 B1 | 10/2013 | Subealdea et al. | |
| 8,817,961 B1 | 8/2014 | Sterman | |
| 9,483,784 B2 | 11/2016 | Raney | |
| 9,519,682 B1 | 12/2016 | Pujara et al. | |
| 9,706,401 B2 | 7/2017 | Vincent et al. | |
| 10,149,156 B1 | 12/2018 | Tiku et al. | |
| 10,154,025 B2 | 12/2018 | Tinnakornsrisuphap et al. | |

| | | | |
|---|---|---|---|
| 10,218,695 B1 | 2/2019 | Jain | |
| 10,445,732 B2 | 10/2019 | Oberheide et al. | |
| 10,535,086 B2 | 1/2020 | Raman | |
| 10,659,459 B1 | 5/2020 | Gadwale | |
| 10,958,774 B1 | 3/2021 | Harding | |
| 11,373,663 B2 * | 6/2022 | Huber ..................... G10L 17/02 |
| 11,587,056 B2 | 2/2023 | Xiu et al. | |
| 2003/0110381 A1 | 6/2003 | Aoshima et al. | |

(Continued)

FOREIGN PATENT DOCUMENTS

KR          20220066842 A          5/2022

OTHER PUBLICATIONS

Alexandre Alapetite, "Dynamic 2D-barcodes for multi-device Web session migration including mobile phones", Technical University of Denmark, Department of Management Engineering Produktionstorvet 426-A, DK-2800 Kongens Lyngby, Denmark, doi: 10.1007/ s00779-009-0228-5. (Year: 2010).

*Primary Examiner* — Jirapon Tulop
(74) *Attorney, Agent, or Firm* — Potomac Law, PLLC; Dannon G. Allbee

(57)          ABSTRACT

Methods and systems described herein are directed to verifying a caller's identity during a phone call by exchanging sub-audible tones between two parties to a phone call. A code, password, or other message can be embedded within telephone audio signals as sub-audible tones, which can be used to facilitate a verification process. The combined audio signal that includes sub-audible tones can be analyzed by a receiving device to extract an embedded code or message. Aspects of cryptographic schemes can be implemented using sub-audible tones—such as time-based one-time passwords (TOTP) and handshakes—which verify the identity of a party to a call. Based on the outcome of the verification process, the user can be notified whether verification was successful.

20 Claims, 13 Drawing Sheets

(56)            References Cited

U.S. PATENT DOCUMENTS

| | | | |
|---|---|---|---|
| 2004/0153414 A1 | 8/2004 | Khaishgi et al. |
| 2006/0053296 A1 | 3/2006 | Busboom et al. |
| 2008/0181379 A1 | 7/2008 | Chow et al. |
| 2011/0149867 A1 | 6/2011 | Rudolf et al. |
| 2011/0219427 A1 | 9/2011 | Hito et al. |
| 2011/0270751 A1 | 11/2011 | Csinger et al. |
| 2012/0198531 A1 | 8/2012 | Ort et al. |
| 2012/0203708 A1 | 8/2012 | Psota et al. |
| 2013/0262857 A1 | 10/2013 | Neuman et al. |
| 2014/0223516 A1 | 8/2014 | Vongsouvanh et al. |
| 2014/0230039 A1 | 8/2014 | Prakash et al. |
| 2014/0258032 A1 | 9/2014 | Psota et al. |
| 2015/0073929 A1 | 3/2015 | Psota et al. |
| 2015/0334108 A1 | 11/2015 | Khalil et al. |
| 2016/0217464 A1 | 7/2016 | Jajara et al. |
| 2017/0068958 A1 | 3/2017 | Oberheide et al. |
| 2017/0140134 A1 | 5/2017 | Brough et al. |
| 2017/0142128 A1 | 5/2017 | McCormack et al. |
| 2017/0250974 A1 | 8/2017 | Antonyraj et al. |
| 2018/0034798 A1 | 2/2018 | Vincent et al. |
| 2018/0041339 A1 | 2/2018 | Lee |
| 2018/0253722 A1 | 9/2018 | Gupta |
| 2018/0332042 A1 | 11/2018 | Yu et al. |
| 2019/0074972 A1 | 3/2019 | Shastri et al. |
| 2019/0228173 A1 | 7/2019 | Gupta et al. |
| 2019/0297075 A1 | 9/2019 | Kaladgi et al. |
| 2019/0306158 A1 | 10/2019 | Jain |
| 2019/0312726 A1 | 10/2019 | Sierra et al. |
| 2019/0327226 A1 | 10/2019 | Brown et al. |
| 2019/0356672 A1 | 11/2019 | Bondugula et al. |
| 2019/0386984 A1 | 12/2019 | Thakkar et al. |
| 2020/0029268 A1 | 1/2020 | Russell et al. |
| 2020/0104428 A1 | 4/2020 | Bier et al. |
| 2020/0125247 A1 | 4/2020 | Benkreira et al. |
| 2020/0236113 A1 | 7/2020 | Monica et al. |
| 2020/0372519 A1 | 11/2020 | Repaka et al. |
| 2020/0382510 A1 | 12/2020 | Dunjic et al. |
| 2021/0073933 A1 | 3/2021 | Punnoose et al. |
| 2021/0092227 A1 | 3/2021 | Naujok et al. |
| 2021/0110500 A1 | 4/2021 | Nayudu et al. |
| 2021/0144010 A1 | 5/2021 | Tang et al. |
| 2021/0152689 A1 | 5/2021 | Gayaldo |
| 2021/0201328 A1 | 7/2021 | Gunther |
| 2021/0216658 A1 | 7/2021 | Watson et al. |
| 2021/0272560 A1 * | 9/2021 | Trent, Jr. ................ G10L 15/20 |
| 2023/0067155 A1 | 3/2023 | Jackson et al. |
| 2023/0241514 A1 | 8/2023 | Dalmia et al. |
| 2024/0095720 A1 | 3/2024 | Binder et al. |
| 2024/0127258 A1 | 4/2024 | Brannan et al. |

* cited by examiner

700 caller device 706 generate secret key

708 transmit secret key 710 initiate phone call 714 answer phone call 716 callee device 704 register secret key

712 generate expected code

718 record audio clip

720 identify code from sub-audible tone(s)

722 compare identified code and expected code

724 verify caller

726

730 caller device 706 callee device 704 initiate phone call 732 answer phone call 734 generate sub-audible tone(s) from code 736 play verification sub-audible tones 738 identify code from sub-audible tone(s) 740 generate response code and sub-audible tone(s) 742 play response sub-audible tones 744 verify caller based on response code 746

830

802

834

CALL SOURCE VERIFICATION

TECHNICAL FIELD

The present disclosure is directed to methods and systems for verifying a caller's identity during a phone call using in-band and/or out-of-band signals.

BACKGROUND

The invention of the telephone enabled individuals to talk with family and friends and conduct business, without having to be in the physical presence of the person they are speaking with. Such communication at a distance presents an inherent risk: how can the called party verify the identity of the calling party? Historically, an individual or company is assigned a unique phone number which could be used to manually verify the identity of a caller. When "Caller ID" was introduced, the calling party's registered name would appear on the called party's phone, making it possible to identify the caller without knowledge of the specific phone number. Finally, the dialogue itself between the two parties to a telephone call have been used to verify the identity of one or both parties (e.g., asking identification verification questions to the caller or callee).

In spite of these existing measures, leading cybersecurity companies have reported that telephone scams—such as technical support scams, government agent impersonation scams, and overpayment or refund scams—as the top phishing threat to consumers, with some surveys reporting that over half of respondents had been targeted by a telephone scam in the past year. Tools have been developed to spoof telephone numbers and caller ID, fooling called parties that the caller is a representative from a government agency or legitimate business. In addition, social engineering techniques have been used effectively to convince called parties to perform some action, provide sensitive information, and/or enter information into a phishing website that is designed to mimic the appearance of a legitimate business's website. Furthermore, although scammers tend to operate out of foreign countries, large companies tend to outsource telephone-based customer service to businesses in foreign countries, such that a scammer's foreign accent is less likely to be considered suspicious by the average consumer.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
FIG. 1 is a block diagram illustrating an overview of devices on which some implementations can operate.
Figure 1:
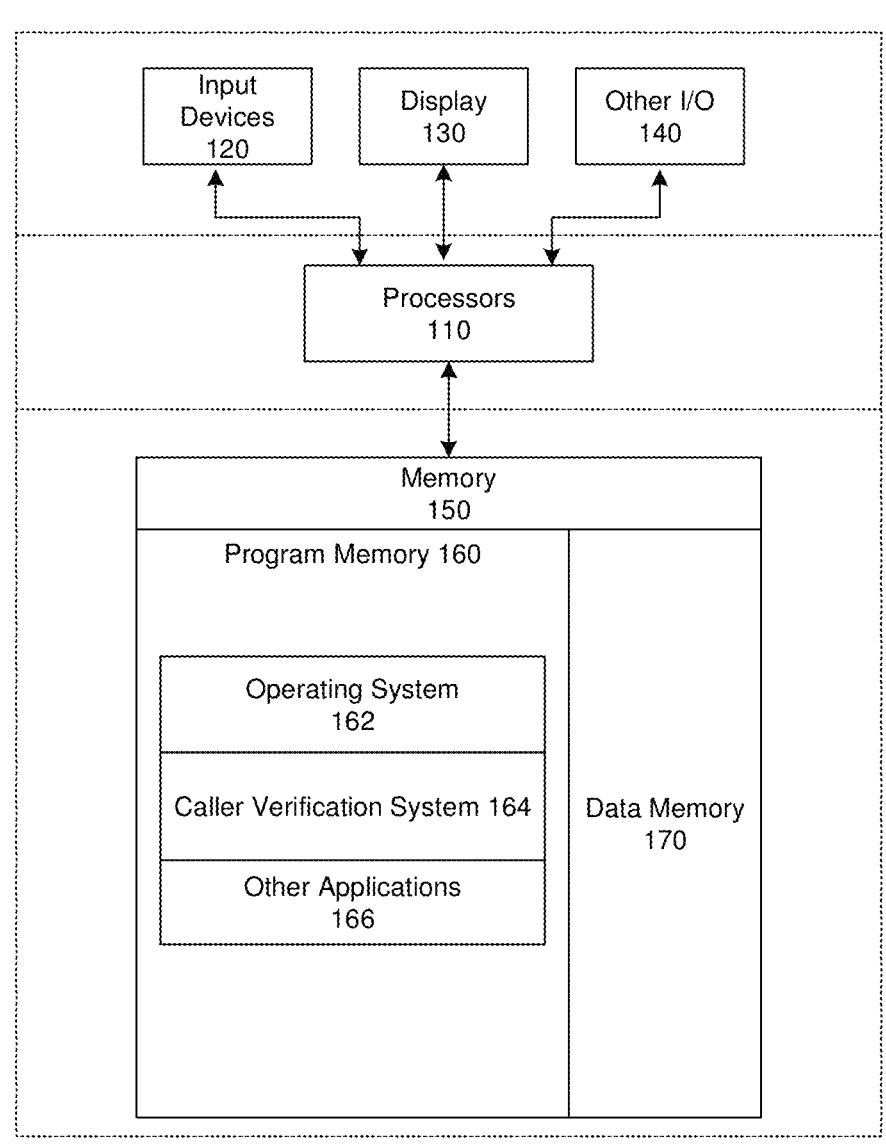

Aspects of the present disclosure are directed to methods and systems for verifying a caller's identity during a phone call using in-band and/or out-of-band signals. In an example embodiment, a calling party's ("caller") phone system can superimpose audio from a microphone with one or more sub-audible tones (e.g., inaudible, barely audible, infrasonic, ultrasonic, etc.), which represent a code used to facilitate caller verification. The called party's ("callee") device can process the audio to extract the code, which may either verify the caller's identification, or may be used as a part of a caller verification process. For example, the caller and the callee may have previously exchanged a secret key that is used to generate a rotating, time-based one-time password (TOTP). The caller's device can superimpose sub-audible tones representing the TOTP, and the callee's device can check that the code represented by the sub-audible tones matches the expected TOTP. As another example, the callee's device can convey an initial code as sub-audible tone(s), which are received and processed by the caller's device to generate a response code that are conveyed back to the callee's device in the form of sub-audible tone(s), with the response code being generated by a cryptographic algorithm to perform cryptographic verification via in-band audio signals.

Typical approaches to verifying a caller's identity are vulnerable to spoofing and social engineering. While out-of-band data can be transmitted with in-band audio signals (e.g., song information with FM radio stations, caller ID with phone calls, etc.), this data can be spoofed to give the illusion that an illegitimate caller is a representative of a legitimate company or institution. And while verification questions provided over the phone are often used to verify an individual before a company or institution, the reverse process (i.e., having the end user ask verification questions to a company or institution) is practically never implemented. Unsurprisingly, telephone calls are one of the most common means of communication used to carry out scams, identity theft, and financial crimes.

Most advances in cryptography have focused on securing digital communications across the Internet Protocol (IP) stack. The advent of public-key cryptography initially led to the development of the secure sockets layer (SSL), which has since been superseded by transport layer security (TLS). Modern cryptography focuses on verifying the identity of two parties across a network by exchanging messages in a sequence known as a "handshake." For instance, a server can send a client a digital certificate, which the client can verify against a trusted certificate authority (CA) store to verify the entity of the server. In some cases, two parties may exchange private keys at one time, which can be used to decrypt messages that are encrypted with a corresponding public key (e.g., Rivest-Shamir-Adleman (RSA) cryptosystems, Diffie-Hellman (DH) key exchange, etc.). Such cryptosystems can be used to verify the identity of another computer across a network, and to encrypt data transmitted across the network to prevent others from learning about the contents of the data transmissions that lack the private key. These cryptosystems have become sufficiently widespread that websites without TLS security are considered unsecure by default.

Despite these significant advances in securing digital communication with cryptography, telephonic communication has remained largely unchanged. Typically, telephonic communication involves converting sound waves into an analog signal using a transducer, such as a microphone, which is subsequently converted to a digital signal using a codec. The digitized signal is then used to modulate an analog carrier signal, which is emitted wirelessly through an antenna and received by a corresponding antenna (e.g., a cellular tower). While some systems enable the transmission of data alongside the modulated audio signal (e.g., in an out-of-band frequency band adjacent to the in-band modulated audio), cellular networks are significantly less secure than modern encrypted digital communication. Mobile cyber attacks (e.g., SS7 hacks) have demonstrated that it is possible to receive unauthorized communication with only knowledge of a victim's phone number. Thus, relying solely on a caller's phone number or caller ID is not sufficient to verify the caller's identity.

Embodiments disclosed herein improve existing telephone communication security by superimposing sub-audible tones representing codes with microphone audio to encode information (e.g., "codes") that facilitate verification or identification of a caller and/or a callee. For example, a customer may create an account with an insurance company, and in the process the two entities securely exchange private keys. If the insurance company calls the customer on a later date, the caller's device and/or the callee's device may generate sub-audible tones representing codes derived from or decryptable using the previously exchanged private keys. For instance, the same private key may be used to derived a time-based one-time password (TOTP) which both the insurance company and the customer can independently generate, and which rotates or changes periodically (e.g., once per minute). As another example, the customer's device may provide sub-audible tones representing a code, which can be decrypted using the private key stored on the insurance company's system and used to generate a response code (which itself may be encrypted and is transmitted back to the customer in the form of a sub-audible code). In these implementations, an unauthorized party (e.g., a scammer) pretending to be the insurance company would be unable to provide a code or exchange codes that verify their identity, either because they are unaware of the sub-audible code exchange process and/or because they do not possess the private keys that were previously securely exchanged. In this manner, in-band sub-audible tones can facilitate caller verification.

In some systems, a callee's telephone may be a landline or otherwise not a smartphone capable of implementing the sub-audible tone messaging system described herein. For example, an elderly person may still rely primarily on a traditional landline to make phone calls. In these circumstances, an external validation device may "listen" to a phone call to carry out operations to facilitate caller verification. For instance, the user may have a home assistant or smart speaker with a microphone that is capable of listening to a phone call (e.g., if the call is on speaker). This external validation device can analyze sub-audible tones, generate sub-audible tones, and communicate the status of caller verification to the landline telephone user (e.g., using chimes, voice notifications, etc.). In some systems, the external validation device may be configured to receive telephone audio directly, such as a wired audio signal that is fed into a computing device.

The home assistant, smart speaker, or other external validation device may be configured to start listening to a conversation upon detecting one or more triggers. For example, the external validation device may be trained to listen for specific key words or phrases from the caller and/or the callee, such as "who is this?" or "hello, this is Company calling." As another example, the external validation device can be configured to listen to a landline phone's ring tone that indicates that there is an incoming call. In some implementations, a specific sub-audible tone (a "start tone") may be present in a caller's audio signal which triggers the caller verification process automatically. If the external validation device identifies that a phone call is underway but does not detect the start tone, the external validation device can notify the callee that the caller could not be verified. The specific trigger or combination of triggers used to initiate caller verification may be user-configurable, so that a user's privacy preferences are respected.

In some implementations, the caller verification process generates a score indicating a likelihood that the caller's identity matches their purported identity. For example, a representative from a company might initiate a call with a customer using their personal cell phone, such that the phone number is unrecognized or is otherwise not apparently related to the company's phone number. However, the representative's personal cell phone may correctly perform the sub-audible tone-based code exchange, such that the caller's identity is highly likely to be authentic. In this example, the system might notify the customer of a score (e.g., 95% confidence of the caller's identity), possibly advising the customer to proceed with some caution or ask follow up questions to further investigate the caller's identity (e.g., "can I please ask why you are not calling from the official company phone number?" or "would you mind calling me back on the official company phone number?"). A caller's verification score may be affected by the caller's phone number, caller ID information, the accuracy of the sub-audible tone generation process, the speed of the sub-audible tone-based code exchange process (e.g., slow code exchange potentially indicating a hacker or man-in-the-middle attack), the words or tone of the caller's speech, and/or other factors.

In alternative embodiments, the caller's device and/or callee's device can transmit codes as out-of-band data, which is transmitted along with the modulated, in-band phone call audio. In these embodiments, codes are transmitted as a "simulcast" or "multicast" whereby adjacent frequency bands transmit data in tandem with telephone audio. Out-of-band signaling can also be combined with in-band signaling to provide more robust or complex identity verification schemes. For instance, digital certificates can be transmitted as out-of-band data, while sub-audible tones representing a TOTP can be transmitted in-band as sub-audible tones-effectively providing two-factor authentication in different frequency bands. The degree of robustness and complexity of a particular implementation may depend on the desired level of security.

The transmission and/or exchange of codes in the form of sub-audible tones notably improves upon existing schemes of manual identity verification-such as caller ID and verification questioning-because they leverage cryptography to significantly increase the difficulty in "cracking" the verification scheme. Where caller ID can be spoofed, and verification questions can be correctly answered with knowledge derived from other hacks or social engineering, cryptographic protocols rely on computational processes such as random number generation, hashing, and other computer-implemented or circuit-implemented algorithms in order to increase the difficulty in cracking the verification scheme. While simple cryptographic protocol implemented without computing systems are vulnerable to hacking using brute force approaches, computer-implemented verification schemes can use larger codes and more complex encryption and decryption algorithms that are significantly more difficult to crack. Whereas a human-implemented cryptographic protocol may be cracked in a fraction of a second by a modern computer, computer-implemented cryptographic protocols can be designed such that it would take a modern computer thousands of years or more to brute force crack.

Moreover, the exchange of codes as sub-audible tones notably improves upon existing methods for verifying callers by introducing a cryptographic scheme that is directly compatible with existing telecommunication protocols. By sending sub-audible tones to exchange codes between a caller and a callee, the security of a telecommunication network can be improved.

As described herein, the term "caller" generally refers to an individual or representative of a company or institution that provides a service to users or customers. In some cases, a caller may be the party that dials a phone call to a callee. In other cases, the caller may be on the receiving end of a phone call initiated by a callee. Put differently, the terms "caller" and "callee" may not necessarily define the party that initiates a phone call. For the purposes of this application, the caller may refer to the party that is verified by a caller verification process according to the present disclosure.

As described herein, the term "callee" generally refers to an individual or user that receives a phone call from an unidentified or unverified caller. The callee may receive a call from an unverified caller, or may initiate a phone call with a caller (e.g., when the callee dials a phone number to contact a company's customer service). The present application generally refers to the unverified party as the caller, as telephone scams typically begin with an unverified caller making a phone call to an unsuspecting callee. However, the caller verification techniques of the present disclosure may be used when a customer or user calls a company or institution.

As described herein, "sub-audible tones" describes sounds that are present within an audio signal that can be detected, deciphered, decoded, demodulated, or otherwise identified using some combination of analog signal processing, digital signal processing, demodulation, frequency analysis, and/or other signal processing techniques. For instance, a sub-audible tone may be a narrowband tone at a center frequency, which can be present at an amplitude that is sufficiently quiet so as not to be distracting or interrupt a phone call, but which can be distinctly identified using signal processing methods like discrete fourier transform (DFT), fast fourier transform (FFT), or the like. The term "sub-audible" may not necessarily imply that a tone cannot be heard by human ears, but rather generally refers to additional, superimposed tones that are produced digitally (or electronically) and combined with microphone audio. In some implementations, sub-audible tones may involve modulation, pulsing, or other divisions other than frequency (e.g., time-division, code-division, etc.).

As described herein, a "code" refers to any message, key, certificate, or other data that is encoded into or decoded from sub-audible tones. A code may be a secret key, public key, one-time password, TOTP, or any other message that is used, at least in part, to verify one or more parties to a phone call. In some cases, a single code may be used to verify a caller (e.g., a TOTP). In other circumstances, multiple codes may be sent between parties to a phone call as sub-audible tones, such as a part of a handshake or sequence of operations that can only be performed correctly with additional information that is not encoded as sub-audible tones (e.g., a secret or private key).

As described herein, "encrypting" a code refers to a process by which data is converted from a raw or unencrypted form into an encrypted form using one or more algorithms and/or circuits. An encrypted code or message may be decrypted using an algorithm that combines the code and other information (e.g., a private key, entropy, etc.) to reproduce the original code or message. In some cases, a code or message can be encrypted using a public key, which can be transmitted publicly across a network. Conversely, "decrypting" a code refers to a process by which encrypted data is converted into unencrypted data using one or more algorithms and/or circuits. In some cases, an encrypted code or message can be decrypted using a private key, which may permit only one or a few parties to decrypt encrypted messages transmitted across a network.

Several implementations are discussed below in more detail in reference to the figures. FIG. 1 is a block diagram illustrating an overview of devices on which some implementations of the disclosed technology can operate. The devices can comprise hardware components of a device 100 that can verify a caller's identity. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, caller verification system 164, and other application programs 166. Memory 150 can also include data memory 170, e.g., cryptographic keys, code-to-tone maps, a list of verified companies or institutions, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
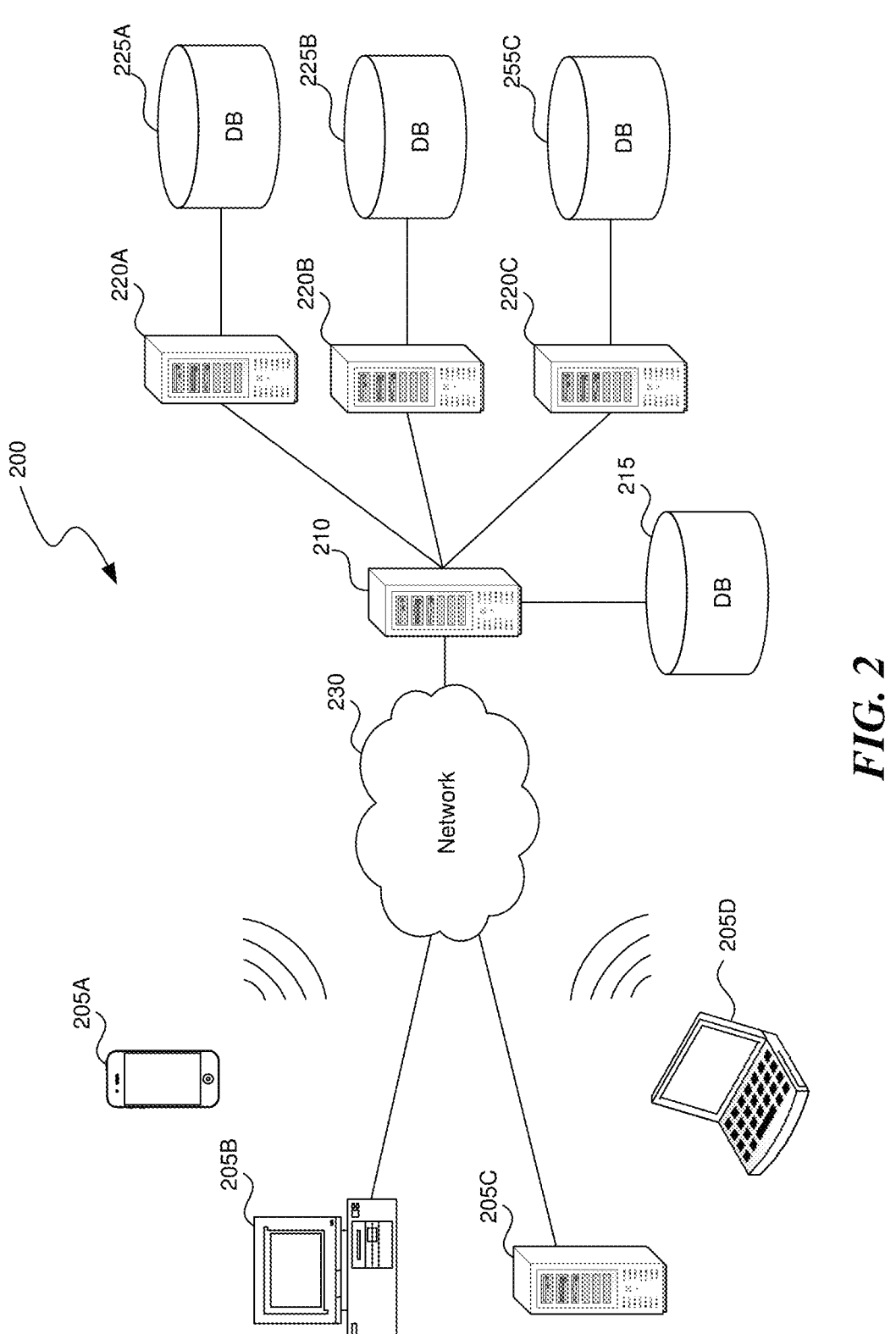
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as cryptographic keys, code-to-tone maps, a list of verified companies or institutions, user preferences. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
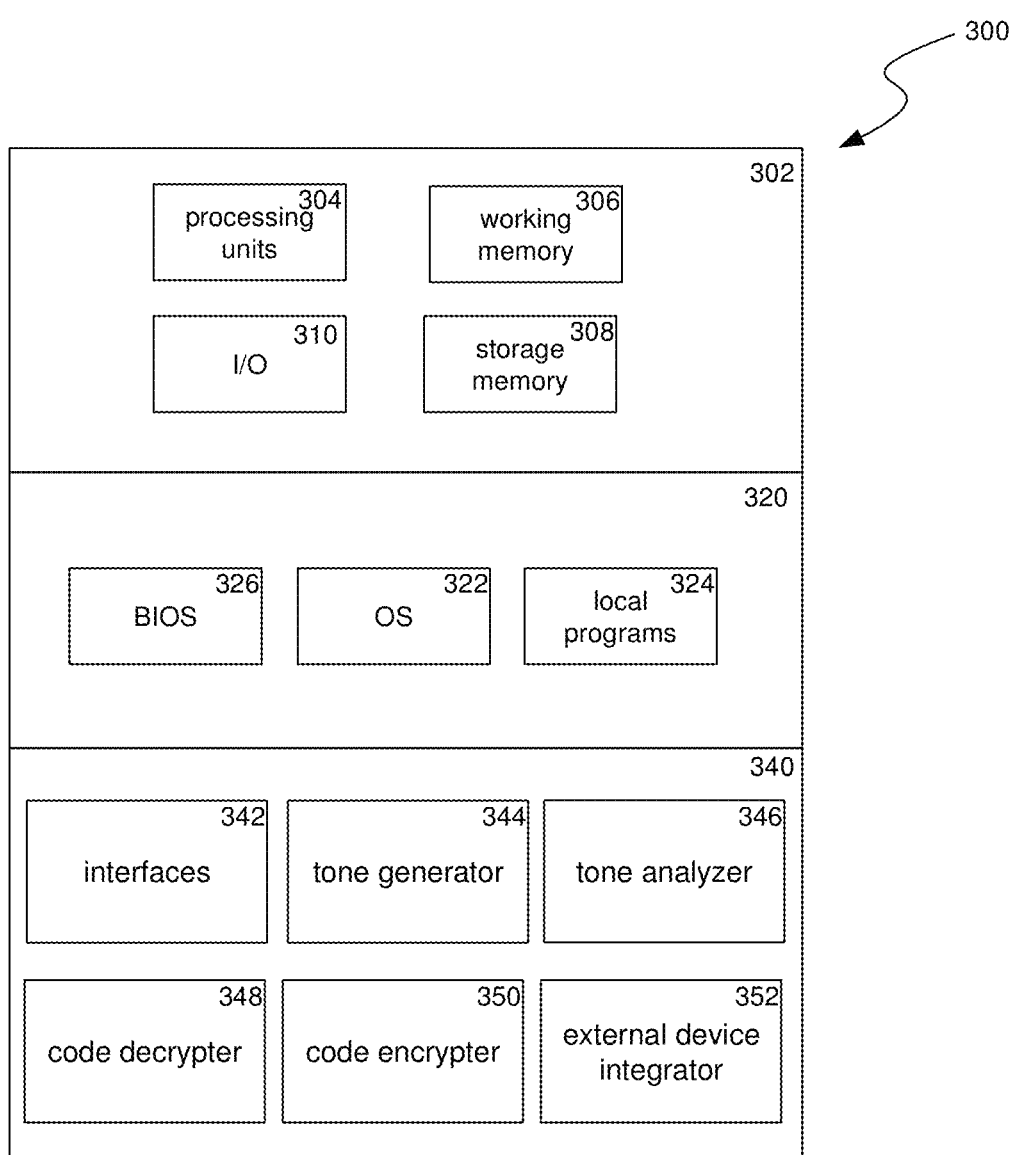
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include tone generator 344, tone analyzer 346, code decrypter 348, code encrypter 350, external device integrator 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Tone generator 344 can generate signals, such as sub-audible tones, which represents a code, message, or other data. For example, a 16-bit code may be represented by sixteen respective narrow band frequencies, with each respective frequency's presence indicating a "1" and the omission indicating a "0" (e.g., 10 KHz, 10.1 kHz, 10.2 kHz, etc.). Tone generator 344 can convert a digital code into a combination of tones that represent the code in audio. In some cases, tone generator 344 can generate digital information representing the mixed, combined, or superimposed combination of tones (e.g., using digital signal processing (DSP) algorithms and/or DSP hardware).

Tone generator 344 can then mix the digitally-represented tones with audio captured by a microphone. In cases where the tones and microphone audio are stored as digital audio, DSP hardware and/or algorithms may be used to mix the two audio files together. Alternatively, the tones and microphone audio can be mixed with analog circuitry before they are transmitted over a telecommunication network. Whether audio is mixed digitally or in analog may vary across different implementations.

Although the examples herein describe the representation of digital codes as frequencies within audio signals, digital codes may be represented through other types of modulation. For example, a particular tonal frequency may be started and stopped at periodic intervals, with the period itself encoding information (e.g., starting and stopping a frequency at 1 Hz represents "001", at 2 Hz represents "010", etc.). In other implementations, a particular tonal frequency can be started and stopped at irregular intervals, with the irregularity representing a certain type of encoding (e.g., similar to morse code). In other words, frequency modulation is just one possible type of encoding, which may be combined with one or more other types of encoding to increase the density of information conveyed in sub-audible tones to thereby enhance the security or robustness of the caller verification process.

Tone analyzer 346 can perform analog signal processing and/or digital signal processing to filter, demodulate, or otherwise extract information transmitted as sub-audible tones within an audio signal. For example, tone analyzer 346 can perform discrete fourier transform (DFT), fast fourier transform (FFT), and/or other algorithms to identify one or more frequencies present within an audio signal and their respective amplitudes over a particular segment of an audio clip (e.g., a number of samples). In some implementations, tone analyzer 346 can also determine the periodicity or time division of a particular tonal frequency (e.g., identify that a 10 kHz tone is periodically added and omitted every half a second).

Tone analyzer 346 may include some combination of software and/or hardware to perform operations similar to a spectrum analyzer and/or a modem, which can convert sub-audible tones into codes according to a known scheme or mapping. For instance, a sub-audible tone map may relate specific frequencies to specific digits of a binary value (e.g., sixteen distinct frequencies each representing a "0" or a "1" which collectively represent a 16-bit value). This mapping may be predetermined and known by a caller's device and a callee's device, such that their respective tone analyzers can translate sub-audible tones into specific codes.

Code decrypter 348 can convert an encrypted code or message into its raw or unencrypted value, using one or more algorithms, circuits, and/or additional input values (e.g., a key, random number, source of entropy, etc.). In some implementations, code decrypter 348 may convert a code from one state into another state, with that state conversion not necessarily involving cryptographic decryption. For instance, code decrypter 348 can determine if a received code matches an expected value, such as with a TOTP verification scheme, password, or other expected message.

Code encrypter 350 can convert a raw code or message into an encrypted version of that code or message, using one or more algorithms, circuits, and/or other input values (e.g., a public key, random number, source of entropy, etc.). In some implementations, code encrypter 350 may convert a code from one state into another state, with that state conversion not necessarily involving cryptographic encryption.

External device integrator 352 can enable the integration of caller verification functionality on a device other than the caller's device or the callee's device. In some embodiments, external device integrator 352 may store configuration information about which device(s) are authorized to perform caller verification and/or which trigger(s) can be used to automatically initiate caller verification, among other possible configuration options. Such configurations may be shared with external verification devices, ensuring that those external devices abide by the privacy preferences of the user.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
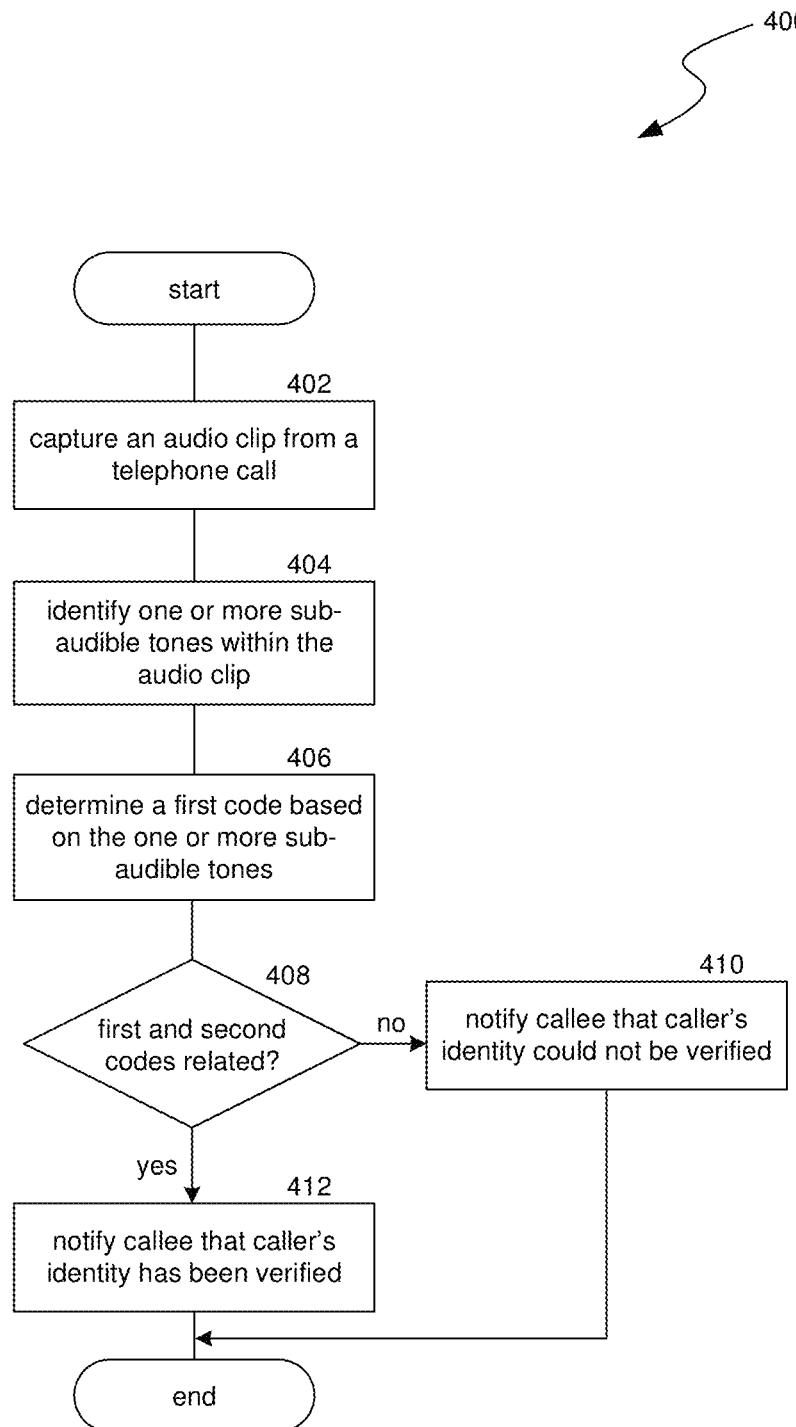
FIG. 4 is a flow diagram illustrating a process used in some implementations for verifying a caller based on sub-audible tones within the caller's audio.

FIG. 4 is a flow diagram illustrating a process 400 used in some implementations for verifying a caller based on sub-audible tones within the caller's audio. In some implementations, process 400 can be performed "just in time," e.g. as a response to a user request to manually verify a caller (e.g., upon pressing button 834 shown in FIG. 8D). In some implementations, process 400 can performed in response to determining that the caller ID of a caller matches (exactly or approximately) a particular individual, company, or institution. In some implementations, process 400 can performed in response to a particular word or words being spoken by the caller (e.g., the name of a particular individual, company, or institution) or by the callee (e.g., "who am I speaking to?", "what is your name?", etc.). In various implementations, process 400 can be automatically triggered in response to detecting an in-band synchronization tone or an out-of-band synchronization request. Process 400 can be performed on the user's device that is facilitating a phone call (e.g., smartphone, tablet, or other computing device) or on a verification device (e.g., a smart speaker, home assistant, or other computing device).

At block 402, process 400 captures an audio clip from a telephone call. Capturing an audio clip may involve sampling an analog audio signal (e.g., using an analog to digital converter, or ADC) to digitize the audio signal. In some implementations, the audio clip can be stored in volatile memory, such as on the callee's phone or an external validation device associated with the callee. In some circumstances, the audio clip can be stored on non-volatile memory, such as in jurisdictions where recording call audio is permitted by law. In some cases, capturing an audio clip may involve live or "just in time" processing, where circuits and/or computer-implemented algorithms live process audio without storing a copy of it in either volatile or non-volatile memory.

At block 404, process 400 identifies one or more sub-audible tones within the audio clip. For instance, tone analyzer 346 can analyze the audio signal to identify specific tonal frequencies, perform spectrum analyses, demodulate tones (if necessary), detect patterns or auditory signatures, and/or otherwise extract embedded signals that were added to the audio to convey information like codes within sound. Information about the identified sub-audible tones (e.g., frequencies, periodicity, etc.) are provided to block 406.

At block 406, process 400 determines a first code based on the identified one or more sub-audible tones. In some implementations, block 406 involves retrieving a sub-audible tone map which is used to translate detected frequencies and/or modulated sub-audible tones (which were identified at block 404) into data that the sub-audible tones were intended to represent. For instance, if multiple narrowband tones are detected at block 404, the center frequencies of those tones are translated at block 406 into data, such as a code or message.

At block 408, process 400 checks whether the first code and a second code are related. Process 400 can involve generating a second code based on a particular algorithm, cryptographic protocol, and/or other process. For example, a TOTP can be generated based on a secret or private key and a current time. If the first code is expected to have been generated as a TOTP using the same private key and the same algorithm, then process 400 can also generate the second code in the same or similar manner and compare the two codes. If the first and second codes are equivalent, then process 400 can determine that the first code was generated using the same private key, thereby verifying the caller.

In other implementations, the first and second codes may be related, but different. For example, an encrypted first code can be decrypted (e.g., with a private key) into an unencrypted or "raw" first code. The second code can be a password, message, or other expected value for the raw or unencrypted first code. For instance, the caller and callee might replace a "verbal password" that was used in a previous authentication scheme with a sub-audible tone-based password, which is first encrypted before it is sent as sub-audible tones over the telephone audio. In this example, the second code can be the raw password value, or can be the encrypted password value. Regardless of the particular implementation, the first code—encrypted or unencrypted—may be related to an expected value (the second code) which serves to verify the identity of one or both of the parties to the phone call.

If the first and second codes are not related, process 400 advances to block 410, where process 400 notifies the callee that the caller's identity could not be verified. For example, process 400 can generate an audible notification that is conveyed to the callee to inform them that the caller could not be verified. Other notifications may include some combination of sounds, voice-to-text, text messaging, email, push notifications, and/or other user interface (UI) elements that inform the callee that the caller could not be verified. An example UI resulting from the execution of block 410 is shown and described with respect to FIG. 8C.

If the first and second codes are related, process 400 advances to block 412, where process 400 notifies the callee that the caller's identity was successfully verified. Notifying the callee may include any of the means of notification described above with respect to block 410. An example user interface resulting from the execution of block 412 is shown and described with respect to FIG. 8B.

Figure 5:
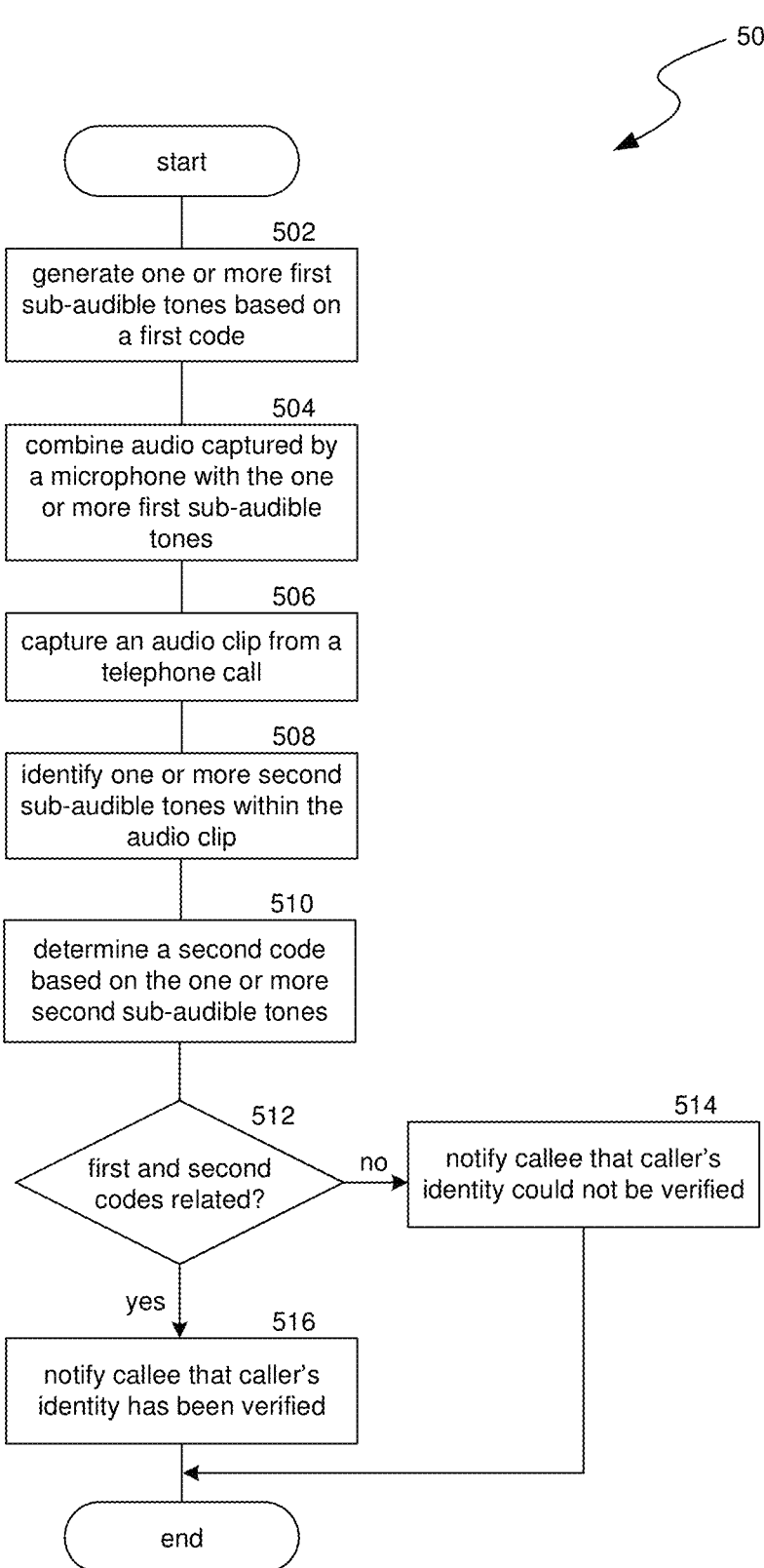
FIG. 5 is a flow diagram illustrating a process used in some implementations for verifying a caller using a sub-audible tone-based handshake.
Figure 8A:
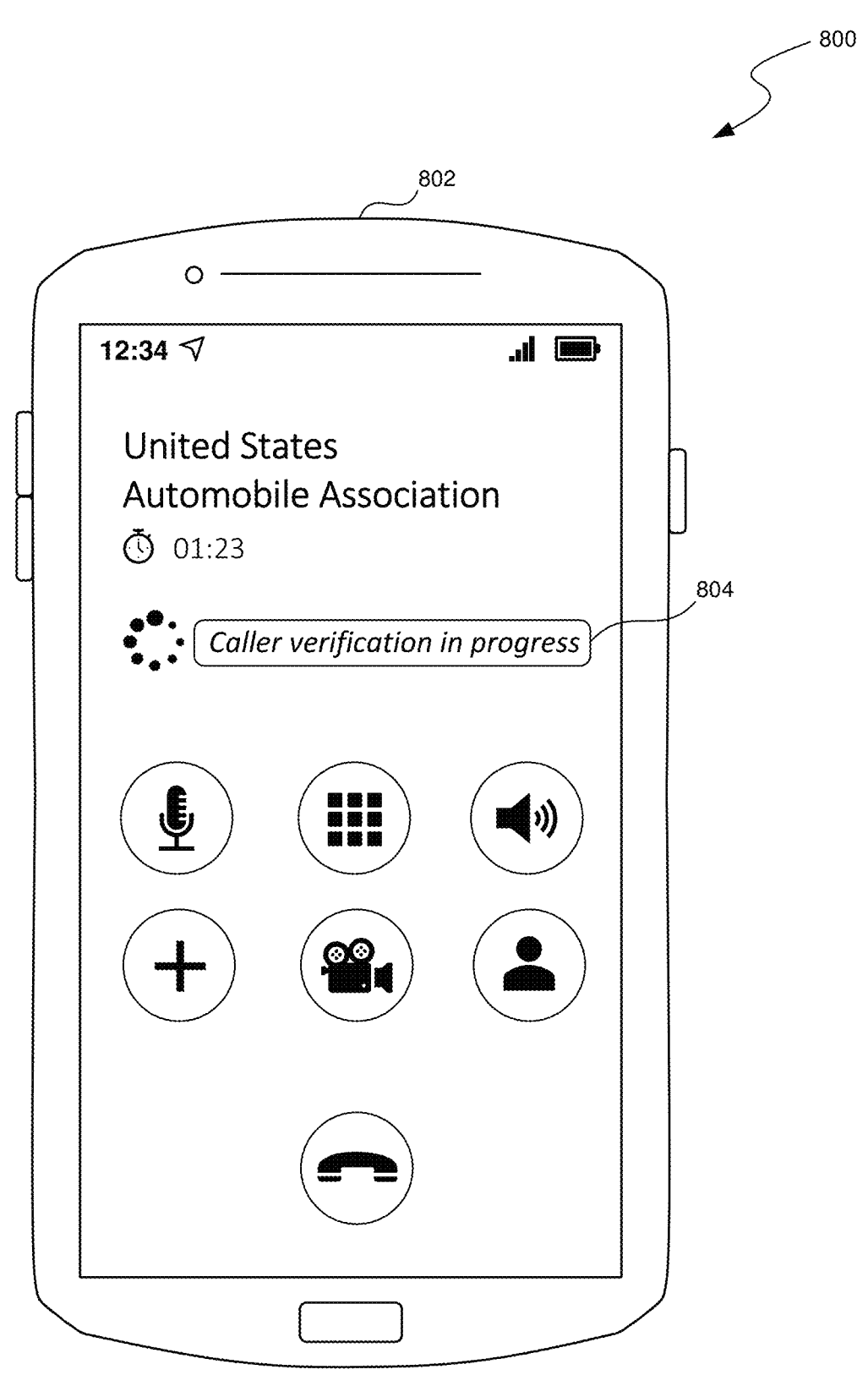
FIG. 8A is a diagram illustrating an example user interface for notifying the user that caller verification is in progress.
Figure 8B:
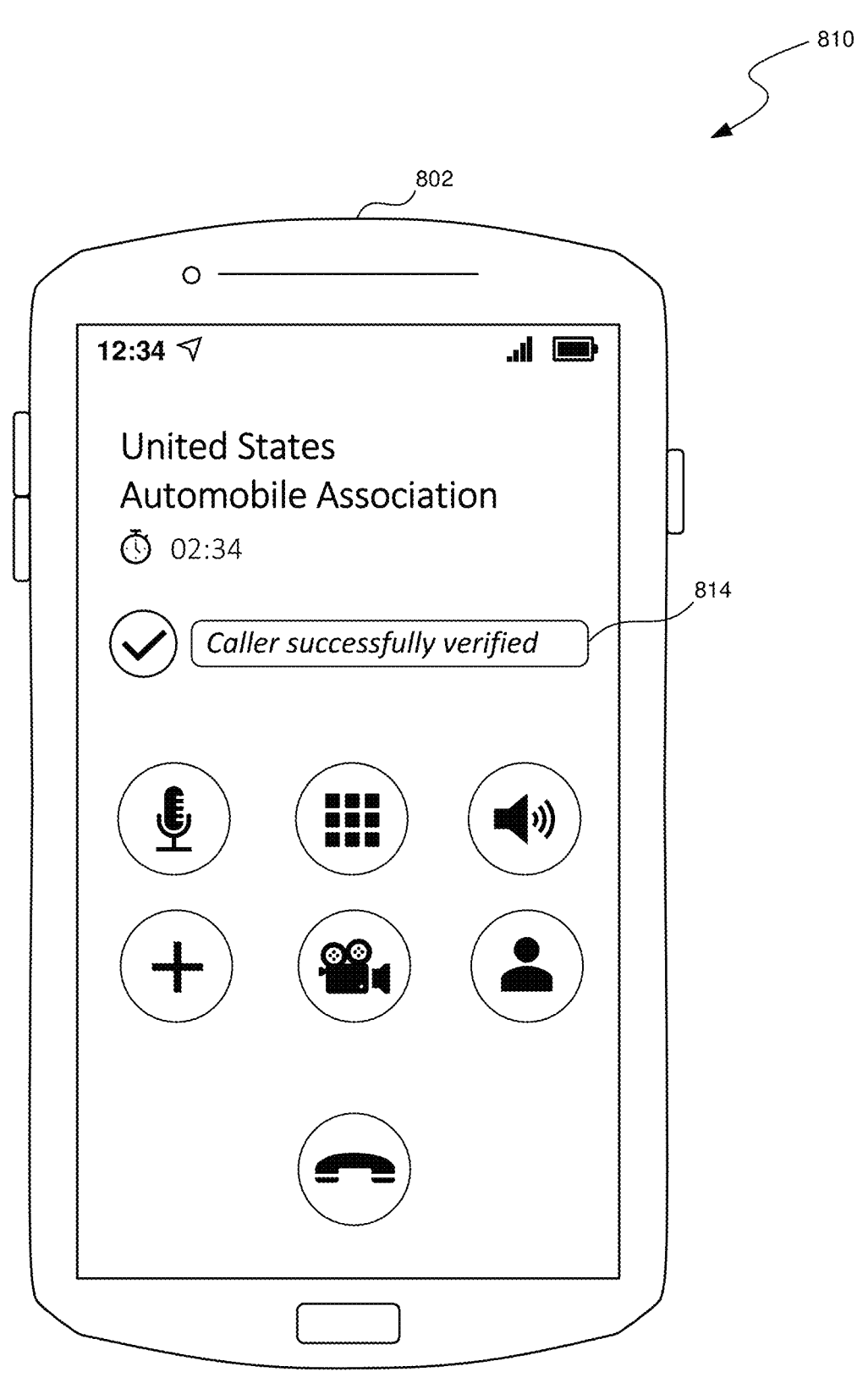
FIG. 8B is a diagram illustrating an example user interface for notifying the user that the caller is successfully verified.
Figure 8C:
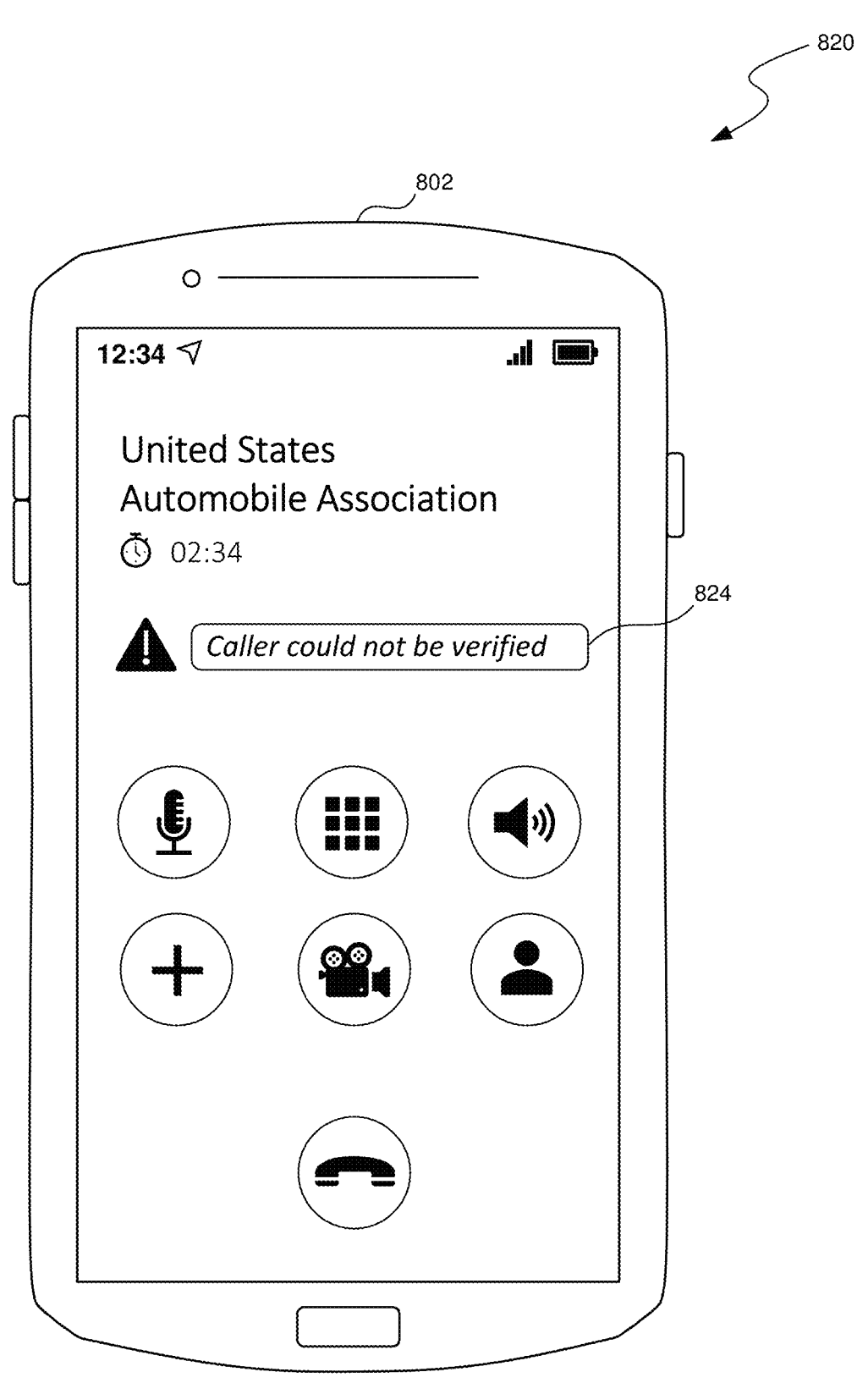
FIG. 8C is a diagram illustrating an example user interface for notifying the user that a caller is not verified.
Figure 8D:
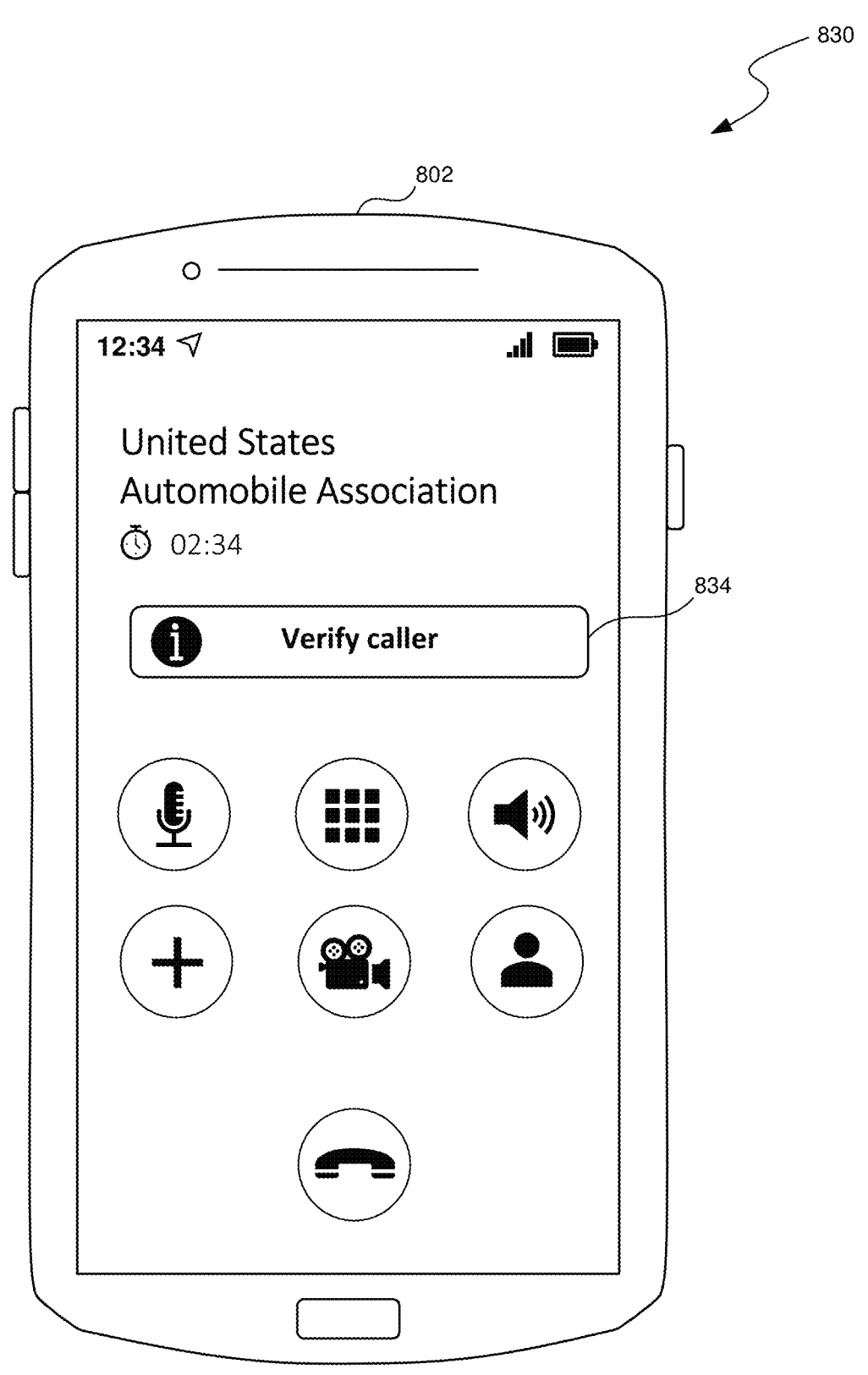
FIG. 8D is a diagram illustrating an example user interface for manually initiating caller verification.

FIG. 5 is a flow diagram illustrating a process used in some implementations for verifying a caller using a sub-audible tone-based handshake. some implementations, process 500 can be performed "just in time," e.g. as a response to a user request to manually verify a caller (e.g., upon pressing button 834 shown in FIG. 8D). In some implementations, process 500 can performed in response to determining that the caller ID of a caller matches (exactly or approximately) a particular individual, company, or institution. In some implementations, process 500 can performed in response to a particular word or words being spoken by the caller (e.g., the name of a particular individual, company, or institution) or by the callee (e.g., "who am I speaking to?", "what is your name?", etc.). In various implementations, process 500 can be automatically triggered in response to detecting an in-band synchronization tone or an out-of-band synchronization request. Process 500 can be performed on the user's device that is facilitating a phone call (e.g., smartphone, tablet, or other computing device) or on a verification device (e.g., a smart speaker, home assistant, or other computing device).

At block 502, process 500 generates one or more first sub-audible tones based on a first code. For example, the first code may be a random number generated by the callee's device, and process 500 might encrypt that random number to determine an encrypted first code (e.g., using code encrypter 350). Process 500 can then generate sub-audible tones representing the encrypted first code (e.g., using tone generator 344). The first code or encrypted first code may serve as a verification code, which can only be decoded, decrypted, or otherwise interpreted by a trusted party with knowledge of a particular cryptographic protocol and/or possession of a private key.

At block 504, process 500 combines audio captured by a microphone with one or more first sub-audible tones. For instance, the sub-audible tones may be stored in memory as a digital audio information, can be mixed with the digital signal from a microphone computationally or with digital mixing hardware to create a digital signal combining the sub-audible tones with the microphone-captured audio. The combined digital audio signal can then be modulated by a modem, which is subsequently transmitted wirelessly to a cellular tower or wired via a landline phone system. Some implementations may mix analog audio signals before they are modulated for transmission across a telecommunications network.

At block 506, process 500 captures an audio clip from a telephone call. The audio clip may be captured during or after the combined audio signal is sent to the other party to the telephone call (i.e., a period where a response code in the form of sub-audible tones is expected). Block 506 may be similar to or the same as block 402 as described above with respect to FIG. 4.

In this example, the callee's device provides verification sub-audible tones, such as an encrypted random number, and expects a response code that is generated based on the decrypted random number—with the decryption only being possible by the caller's device (e.g., due to a private key). As a specific example, the caller's device might decrypt the random number, add or subtract an arbitrary value, encrypt the new value as a response code, and transmit that response code in the form of sub-audible tones. If the callee has knowledge about the operation being done on the random number, then it can use the response to code to determine that the caller possesses both the private key and the correct operation used to validate them. Other cryptographic processes may be used to derive a second code from the encrypted first code, such as a hashing function.

At block 508, process 500 identifies one or more second sub-audible tones within the audio clip. Block 508 may be similar to or the same as block 404 as described above with respect to FIG. 4.

At block 510, process 500 checks whether the first and second codes are related. Block 510 may be similar to or the same as block 408 as described above with respect to FIG. 4. Continuing with the above example, the second one or more sub-audible tones may represent an encrypted second code, with process 500 can decrypt to determine the second code. The decryption process may involve providing the encrypted second code with a private key as inputs to a decryption algorithm or other cryptographic function.

If the first and second codes are not related, process 500 advances to block 514, where process 500 notifies the callee that the caller's identity could not be verified. Notifying the callee at block 514 may be similar to or the same as notifying the callee at block 410 as described above with respect to FIG. 4. However, if the first and second codes are related, process 500 advances to block 516, where process 500 notifies the callee that the caller's identity was successfully verified. Notifying the callee at block 516 may be similar to or the same as notifying the callee at block 412 as described above with respect to FIG. 4.

Figure 6:
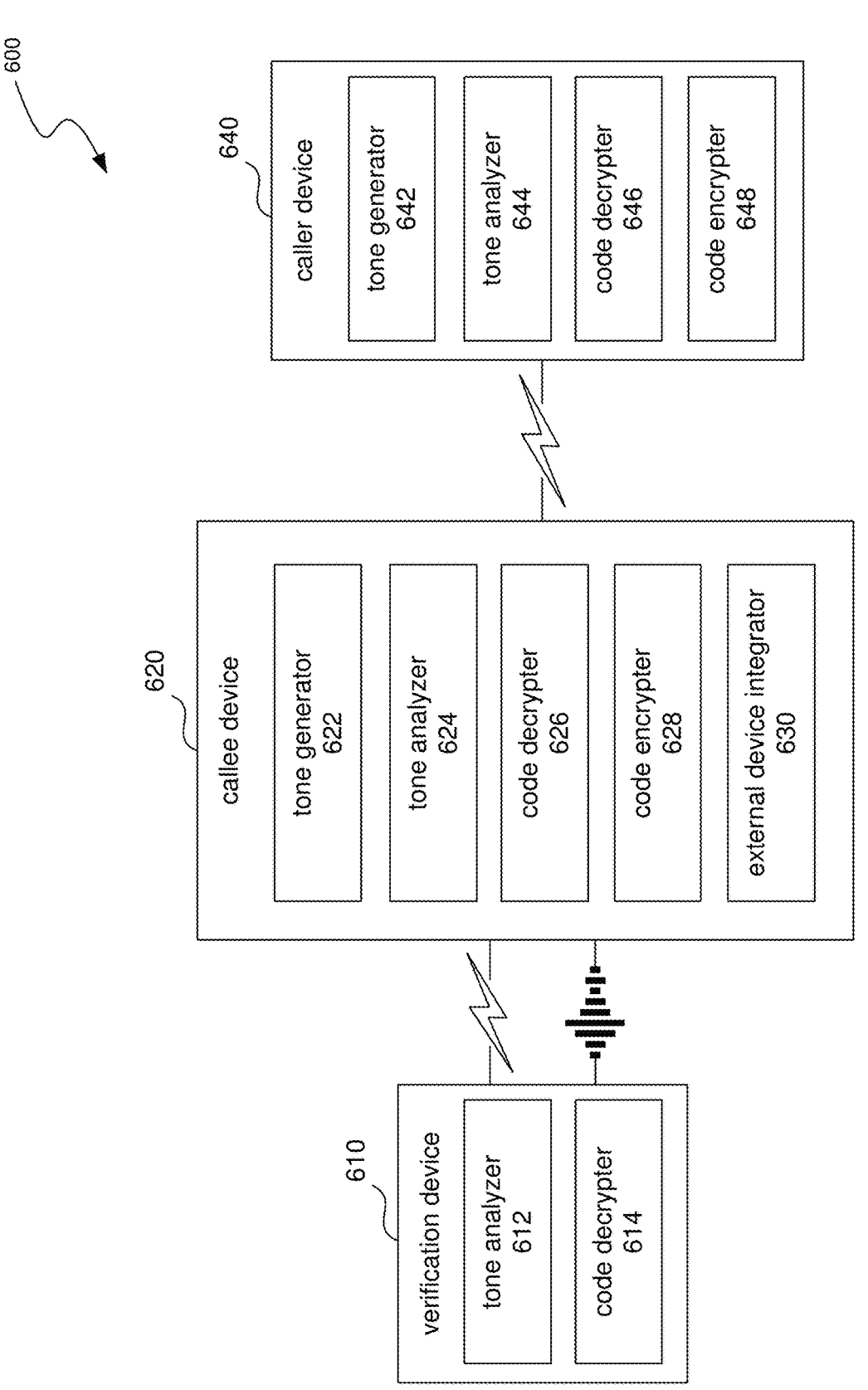
FIG. 6 is a block diagram illustrating an example system for verifying a caller's identity.

FIG. 6 is a block diagram 600 illustrating an example system for verifying a caller's identity. The system includes callee device 620 and caller device 640, which are communicatively connected (e.g., over a network such as a telecommunication network, a wide area network such as the Internet, etc.), which facilitates the transmission of sound information and/or data between them. The system can also include verification device 610, which may be communicatively connected to callee device 620 (e.g., via a wireless connection such as Bluetooth, Wi-Fi, etc.) and/or may be auditorily connected to callee device 620 (e.g., able to receive audio from a phone call from callee device, such as via a microphone or other transducer, or via a direct audio connection such as a wired analog or digital audio signal).

Verification device 610 can include tone analyzer 612 and code decrypter 614, among other possible modules. Callee device 620 can include tone generator 622, tone analyzer 624, code decrypter 626, code encrypter 628, and external device integrator 630, among other possible modules. Caller device 640 can include tone generator 642, tone analyzer 644, code decrypter 646, and code encrypter 648, among other possible modules. Tone generators 622 and 642 may be similar to or the same as tone generator 344. Tone analyzers 612, 624, and 644 may be similar to or the same as tone analyzer 346. Code decrypters 614, 626, and 646 may be similar to or the same as code decrypter 348. Code encrypters 628 and 648 may be similar to or the same as code encrypter 350. External device integrator 630 may be similar to or the same as external device integrator 352. Accordingly, overlapping description of the functionality of modules shown in FIG. 6 may be omitted below.

As shown in FIG. 6, callee device 620 engages in a telephonic communication with caller device 640. This communication may be performed over a wireless cellular network, a wired telecommunication network, or some other network capable of transmitting sound information between devices. Both callee device 620 and caller device 640 may perform tone generation and/or analysis, and code encryption and/or decryption.

Verification device 610 can receive audio signals (e.g., via a direct wired audio connection, or indirectly using a microphone) from callee device 620, to effectively listen to phone call audio from callee device 620. Verification device 610 may be "always on" (i.e., listening for sub-audible tones to facilitate caller verification), may be activated in response to detecting a trigger condition (e.g., hearing a phone's ringtone, hearing a keyword, phrase, or name, etc.), and/or may be activated manually (e.g., a spoken request or command, instruction in an app, an API call, etc.).

In some implementations, verification device 610 can be communicatively connected to callee device 620. For instance, callee device 620 can be a smartphone, tablet, or other computing device equipped with a cellular modem for making phone calls. Verification device 610 may be integrated with callee device 620 to receive audio from callee device 620, to offload aspects of the caller verification process to verification device 610, or to verify callers that call a user's landline phone (i.e., if the callee owns both a smartphone and a landline phone).

In some instances, verification device 610 can transmit notifications to callee device 620. For example, if verification device 610 is triggered to listen for verification sub-audible tones, and none are detected, verification device 610 can transmit a notification to callee device 620 to inform the user that the caller could not be verified. Such notifications may be performed on a local network, via a direct wireless connection, or performed over a wide area network such as the Internet. In some cases, verification device 610 can also provide audible notifications (e.g., generated speech that is emitted through a speaker of verification device 610).

Figure 7A:
FIG. 7A is a sequence diagram of operations performed by devices for verifying a caller's identity on a callee's device from sub-audible tones.
Figure 7B:
FIG. 7B is a sequence diagram of operations performed by devices for verifying a caller using a sub-audible tone-based handshake between a caller's device and a callee's device.
Figure 7C:
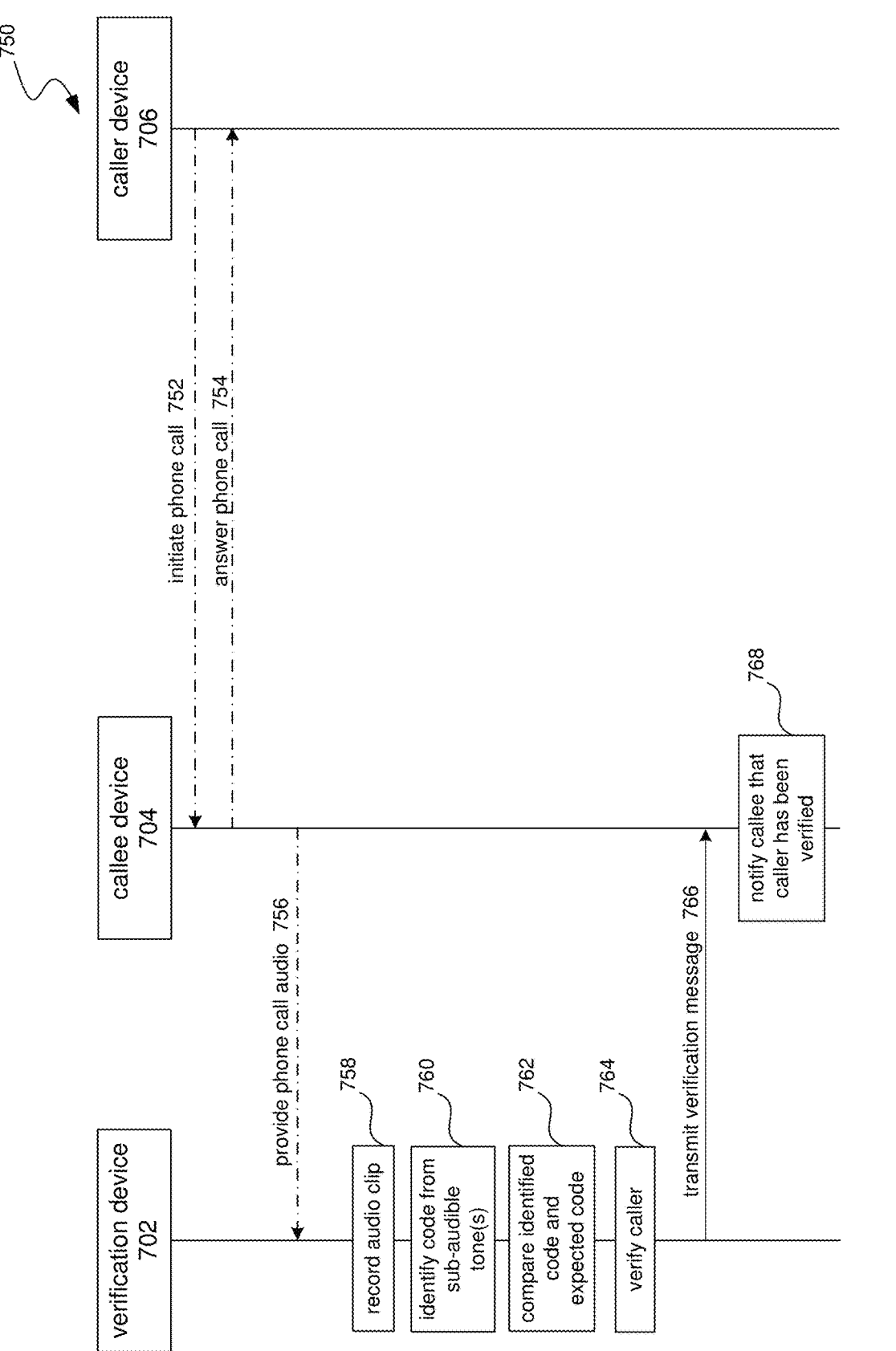
FIG. 7C is a sequence diagram of operations performed by devices for verifying a caller using an external verification device.

FIGS. 7A-7C illustrate sequence diagrams of operations performed by verification device 702, callee device 704, and caller device 706. The verification device 702 may be a smart speaker, home assistant, or other computing device associated with callee device 704, and may be similar to or the same as verification device 610. Callee device 704 may be a client device (e.g., client computing devices 205A-D) of a user, and may be similar to or the same as callee device 620. The caller device 706 may be any client device or computing device associated with an individual, company, or institution that provides a service to the user of callee device 704, and may be similar to or the same as caller device 640. Depending on the particular embodiment, verification device 702 and/or callee device 704 may include an application on its respective program memory for implementing caller verification system 164.

FIG. 7A is a sequence diagram 700 of operations performed by devices for verifying a caller's identity on a callee's device from sub-audible tones. More particularly, the sequence of operations in shown FIG. 7A illustrate an example implementation of TOTP-based caller verification in which a previously-exchanged secret key and the current time are used to generate a time-rotating code. If an imposter fraudulently poses as a legitimate representative of a business or institution, they will not be able to add sub-audible tones representing a TOTP-based code to their call audio because they may not know the secret key and/or the function(s) used to generate the TOTP from the secret key. In this manner, callee device 704 can verify the identity of the caller automatically and securely.

The process begins with caller device 706 generating a secret key at step 708. Caller device 706 transmits the secret key to the callee device 704 at step 710. Callee device 704 then registers the secret key (e.g., stores the secret key in memory or on its filesystem). At a later time, caller device 706 initiates a phone call at step 714, which callee device 704 answers at step 716. Once the phone call has begun, callee device 704 generates an expected code at step 718, such as a TOTP based on the current time and the previously-registered secret key.

Then, callee device 704 records an audio clip at step 720. At step 722, callee device 704 identifies a code from sub-audible tone(s) present within the audio clip. Callee device 704 then compares the identified code with the expected code to determine whether the two codes match or are otherwise related. If the identified code and expected code match, callee device 704 deems the caller as verified at step 726, which can involve notifying the callee that the caller verification process has completed and that verification was successful.

FIG. 7B is a sequence diagram 730 of operations performed by devices for verifying a caller using a sub-audible tone-based handshake between a caller's device and a callee's device. More particularly, the sequence of operations shown in FIG. 7B illustrate an example implementation in which the caller's device 706 identifies a verification code from sub-audible tones and responsively generates a response code based at least in part on the verification code (e.g., using a hashing function, cryptographic process, etc.). This example may be similar to asymmetric or public-key cryptography, where the caller's device is able to decrypt the verification code and generates an encrypted response code that only the callee's device 704 (and/or the verification device 702) can decrypt. Such a call-and-response sequence may be preferred where a higher degree of security is desired, as a handshake process may be considered more secure than a TOTP-based approach.

The process begins with caller device 706 initiating a phone call at step 732, and callee device 704 answering the call at step 734. Callee device 704 then generates sub-audible tone(s) based on a code, such as a random number, password, or other message at step 736. At step 738, callee device 704 plays at least the verification sub-audible tones, which may or may not be mixed with microphone audio prior to modulation and transmission over the telecommunication network.

At step 740, caller device 706 identifies the verification code from the sub-audible tone(s). Caller device 706 may decrypt, decipher, or otherwise process the code from the verification sub-audible tones, depending on the particular implementation. Then, at step 742, caller device 706 generates a response code and sub-audible tones representing that response code (or an encrypted version of the response code), which is provided back to callee device 704 in the form of sub-audible tones at step 744. Upon detecting the response sub-audible tones 744, callee device 704 may perform operations to identify the response code, decrypt the response code if it is encrypted, and determine whether the response code matches an expected response code. Depending on the contents of the response code, callee device 704 can verify the caller at step 746, which can involve notifying the callee that the caller verification process has completed and that verification was successful.

FIG. 7C is a sequence diagram 750 of operations performed by devices for verifying a caller using an external verification device. More particularly, the sequence of operations shown in FIG. 7C illustrate an example implementation in which an external verification device 702 "listens" to the call from the callee device 704 to perform caller verification. Such implementations may be desired where callee device 704 is not a smartphone or otherwise lacks the computing power to implement a caller verification system (e.g., a landline telephone). For instance, verification device 702 may be a smart speaker or home assistant that can capture audio from a callee device 704 (e.g., in response to hearing a wake word or trigger word, in response to hearing the callee device's 704 phone ringing, manually activated by the user of callee device 704, etc.). Such an implementation may be desired for users that do not have a smartphone, or who still own and use a landline telephone.

The process begins with caller device 706 initiating a phone call at step 752, and callee device 704 answering the call at step 754. The phone call audio is then provided by callee device 704 to verification device 702 at step 756—which may involve the callee device 704 playing the phone audio through a speaker, providing an analog or digital audio signal of the phone call through a wired connection to a separate computing device, or wirelessly streaming the phone call audio to the verification device 702. The phone call audio may be sent over a duration of time from the callee device 704 to verification device 702.

Verification device 702 then performs a sequence of operations similar to those shown and described with respect to FIG. 7A. At step 758, verification device 702 records an audio clip from the received phone call audio. Then, verification device 702 identifies a code from the sub-audible tones at step 760. At step 762, verification device 702 compares the identified code against an expected code to determine if they match or are otherwise related. If the identified and expected codes match, at step 764, verification device 702 verifies the caller. In this example, verification device 702 transmits a verification message to callee device 704 at step 766. In response to receiving the verification message, at step 768, callee device 704 notifies the callee that the caller has been verified.

FIG. 8A is a diagram 800 illustrating an example user interface (UI) for notifying the user that caller verification is in progress on a callee's device 802. An application or service may execute on the operating system of the callee's device 802, which performs caller verification and renders UI elements within an existing application or as a part of a separate application. The UI elements may be used to notify the user about the status of a caller verification process. In this example, notification 804 is shown on the screen, indicating to the user that a caller verification process is in progress—thereby informing the user that the caller has not yet been verified, and that the process of verification is currently being executed. Notification 804 suggests to the user not to provide sensitive information until the caller verification process finishes.

In some implementations, an audible notification (e.g., a bell, sound byte, text-to-speech reading of notification, etc.) can also be generated to audibly convey information provided in notification 804. For example, if the screen of the callee's device 802 is turned off, or if the callee's device 802 is held up to the user's ear (e.g., as detected by proximity sensors), a corresponding audible notification may be generated to ensure that the user becomes aware of notification 804.

FIG. 8B is a diagram 810 illustrating an example UI for notifying the user that the caller is successfully verified on the callee's device 802. In this example, notification 814 is shown on the screen, indicating to the user that a caller verification process has finished and that the caller's identity has been verified. Notification 814 suggests to the user that it is now safe to trust the caller and provide sensitive information to them, if necessary. As described above, an audible notification corresponding to notification 814 may be generated to ensure that the user becomes aware of notification 814.

FIG. 8C is a diagram 820 illustrating an example UI for notifying the user that a caller is not verified on the callee's device 802. In this example, notification 824 is shown on the screen, indicating to the user that a caller verification process has finished and that the caller's identity could not be verified. Notification 824 suggests to the user that it is unsafe to trust the caller, and that they should take caution before providing sensitive information to them. As described above, an audible notification corresponding to notification 824 may be generated to ensure that the user becomes aware of notification 824.

FIG. 8D is a diagram 830 illustrating an example UI for manually initiating caller verification on the callee's device 802. In this example, button 834 is shown on the screen, which can be interacted with by the user to manually initiate a caller verification process. Button 834 suggests to the user not to provide sensitive information until the caller has been verified (e.g., with the suggestion possibly made explicit if the user clicks on the information icon within button 834). In some cases, button 834 may appear after a previous attempt to verify the caller failed, enabling the user to manually retry the caller verification process. As with the notification examples described above, an audible notification may prompt the user to manually initiate caller verification if the user does not see the on-screen button 834 (e.g., "this caller has not been verified; please press the on-screen button if you wish to verify the caller").

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for verifying a party to a telephone call, the method comprising:
   recording an audio clip from a telephone call between a caller and a callee;
   identifying one or more sub-audible tones within the audio clip, wherein the one or more sub-audible tones originate from the caller and occur at a first time;
   determining a first code based on the one or more sub-audible tones and a sub-audible tone map;
   generating a second code based at least in part on the first time;
   determining that the first code is related to the second code; and
   in response to determining that the first code is related to the second code, notifying the callee that the caller has been verified.

2. The method of claim 1, wherein the recording of the audio clip begins in response to detecting a trigger condition, and wherein the method further comprises:
   receiving caller ID information indicating an identity of the caller;
   detecting the trigger condition by determining that the caller ID information matches a stored identity; and
   in response to determining that the caller ID information matches a stored identity, begin the recording of the audio clip.

3. The method of claim 1, wherein the identification of the one or more sub-audible tones begins in response to detecting a trigger condition, and wherein the method further comprises:

determining, from at least a portion of the audio clip, one or more spoken words; and detecting the trigger condition by determining that the one or more spoken words matches one or more stored words, wherein the one or more stored words represent at least one of the following: (i) a name of the caller; (ii) a spoken command to verify the caller; and (iii) a phrase that indicates that the caller's identity is in question;

wherein the identification of the one or more sub-audible tones is in response to determining that the one or more spoken words matches one or more stored words.

4. The method of claim 1, wherein the recording of the audio clip begins in response to detecting a trigger condition, and wherein the method further comprises:

detecting the trigger condition by receiving a request to manually initiate caller verification;

wherein the recording of the audio clip is in response to receiving the request.

5. The method of claim 1, wherein the one or more sub-audible tones are one or more second sub-audible tones, wherein the recording of the audio clip begins in response to detecting a trigger condition, and wherein the method further comprises:

detecting the trigger condition by identifying one or more first sub-audible tones from an audio signal from the telephone call, wherein the one or more first sub-audible tones indicate a request to begin caller verification;

wherein the recording of the audio clip is in response to identifying the one or more first sub-audible tones.

6. The method of claim 1, wherein the telephone call occurs between a caller's device associated with the caller and a callee's device associated with the callee, and wherein the method is performed on an external validation device associated with the callee.

7. The method of claim 1, wherein the telephone call occurs between a caller's device associated with the caller and a callee's device associated with the callee, and wherein the method further comprises:

generating, by the callee's device, a key at a second time, wherein the second time is before the first time; and transmitting the key to the caller's device;

wherein the first code is generated based in part on the key;

wherein generating the second code is further based on the key; and wherein determining that the first code is related to the second code comprises determining that the first code is equivalent to the second code.

8. The method of claim 1, wherein the telephone call occurs between a caller's device associated with the caller and a callee's device associated with the callee, and wherein the method further comprises:

generating, by the caller's device, a key at a second time, wherein the second time is before the first time; and transmitting the key to the callee's device;

wherein the first code is generated based in part on the key;

wherein generating the second code is further based on the key; and wherein determining that the first code is related to the second code comprises determining that the first code is equivalent to the second code.

9. A computing system associated with a first party for verifying a second party to a telephone call, the computing system comprising:

one or more processors; and one or more memories storing instructions that, when executed by the one or more processors, cause the computing system to perform operations comprising:

generating one or more first sub-audible tones based at least in part on a first code;

combining an audio signal captured by a microphone with the one or more first sub-audible tones to generate a first combined audio signal;

transmitting the first combined audio signal to a phone system associated with the second party;

receiving a second combined audio signal from the phone system associated with the second party;

identifying, from the second combined audio signal, one or more second sub-audible tones;

determining a second code based at least in part on the one or more second sub-audible tones;

determining that the first code is related to the second code; and in response to determining that the first code is related to the second code, generating a notification to the first party that the second party has been verified.

10. The computing system of claim 9, wherein determining that the first code is related to the second code comprises:

performing one or more predetermined operations on the first code to generate a third code; and determining that the first code and the third code are equivalent.

11. The computing system of claim 9, wherein the second code is encrypted, and wherein determining that the first code is related to the second code comprises:

decrypting the second code with a key to determine a third code;

performing one or more predetermined operations on the third code to generate a fourth code; and determining that the first code and the fourth code are equivalent.

12. The computing system of claim 9, wherein the instructions further cause the computing device to perform operations further comprising:

receiving an input from the first party indicative of a request to verify the second party;

wherein the generating the one or more first sub-audible tones based at least in part on the first code is in response to receiving the input.

13. The computing system of claim 9, further comprising a tone generator, and wherein the generation of the one or more first sub-audible tones based at least in part on the first code comprises:

retrieving, from the one or more memories, a sub-audible tone map that maps code digits to respective frequencies; and generating, using the tone generator, a digital audio signal representing the first code based on the sub-audible tone map.

14. The computing system of claim 9, further comprising a tone analyzer, and wherein the identification of the one or more second sub-audible tones comprises:

retrieving, from the one or more memories, a sub-audible tone map that maps code digits to respective frequencies; and detecting, using the tone analyzer, one or more frequencies from the second combined audio signal;

wherein determining the second code comprises determining one or more code digits corresponding to the detected one or more frequencies according to the sub-audible tone map.

15. A non-transitory computer-readable storage medium storing instructions that, when executed by a computing system, cause the computing system to perform a process for verifying a party to a telephone call, the process comprising:

recording an audio clip from a telephone call between a caller and a callee;

identifying one or more sub-audible tones within the audio clip, wherein the one or more sub-audible tones originate from the caller and occur at a first time;

determining a first code based on the one or more sub-audible tones and a sub-audible tone map;

generating a second code based at least in part on the first time;

determining that the first code is related to the second code; and in response to determining that the first code is related to the second code, notifying the callee that the caller has been verified.

16. The non-transitory computer-readable storage medium of claim 15, wherein the recording of the audio clip begins in response to detecting a trigger condition, and wherein the process further comprises:

receiving caller ID information indicating an identity of the caller; and detecting the trigger condition by determining that the caller ID information matches a stored identity;

wherein the recording of the audio clip is in response to determining that the caller ID information matches a stored identity.

17. The non-transitory computer-readable storage medium of claim 15, wherein the identification of the one or more sub-audible tones begins in response to detecting a trigger condition, and wherein the process further comprises:

determining, from at least a portion of the audio clip, one or more spoken words; and detecting the trigger condition by determining that the one or more spoken words matches one or more stored words, wherein the one or more stored words represent at least one of the following: (i) a name of the caller; (ii) a spoken command to verify the caller; and (iii) a phrase that indicates that the caller's identity is in question;

wherein the identifying one or more sub-audible tones within the audio clip is in response to determining that the one or more spoken words matches one or more stored words.

18. The non-transitory computer-readable storage medium of claim 15, wherein the recording of the audio clip begins in response to detecting a trigger condition, and wherein the process further comprises:

detecting the trigger condition by receiving a request to manually initiate caller verification;

wherein the recording of the audio clip is in response to receiving the request.

19. The non-transitory computer-readable storage medium of claim 15, wherein the one or more sub-audible tones are one or more second sub-audible tones, wherein the recording of the audio clip begins in response to detecting a trigger condition, and wherein the process further comprises:

detecting the trigger condition by identifying one or more first sub-audible tones from an audio signal from the telephone call, wherein the one or more first sub-audible tones indicate a request to begin caller verification;

wherein the recording of the audio clip is in response to identifying the one or more first sub-audible tones.

20. The non-transitory computer-readable storage medium of claim 15, wherein the telephone call occurs between a caller's device associated with the caller and a callee's device associated with the callee, and wherein the process further comprises:

generating, by the callee's device, a key at a second time, wherein the second time is before the first time; and transmitting the key to the caller's device;

wherein the first code is generated based in part on the key;

wherein generating the second code is further based on the key; and wherein determining that the first code is related to the second code comprises determining that the first code is equivalent to the second code.

* * * * *